Patented Apr. 22, 1947

2,419,255

UNITED STATES PATENT OFFICE 2,419,255

PROCESS OF MAKING A CARBON MONOXIDE OXIDATION CATALYST

Joseph G. Dely, Queens Village, N. Y., assignor to Tennessee Valley Authority, a corporation of the United States of America No Drawing. Application July 17, 1943, Serial No. 495,119½

3 Claims. (Cl. 252—259.2)

This invention relates to the art of making metallic oxide catalysts, particularly those adapted for use in the oxidation of carbon monoxide in the presence of water vapor.

The principal object of this invention is to provide a method for the production of active metallic oxide catalytic compositions which will not disintegrate appreciably during long periods of service as a catalyst. Another object of this invention is to provide a method for the production of catalytic compositions which are so rugged that after extended service, they may be treated mechanically to remove solid impurities deposited thereon without any deleterious effect to the physical configuration of the catalyst particles. A still further object of this invention is to provide a method for the incorporation of a magnesium oxide base with one or more additional constituent materials and/or promoters. Other objects of this invention include the provision of an economical method for the commercial production of active oxide catalysts for oxidation reactions.

The usual practice employed in the production of metallic oxide catalyst is to ignite a metal salt to produce a pure metal oxide therefrom or to ignite a precipitated metal oxide compound and also produce a pure metal oxide therefrom. Thereafter, the metal oxide powder is mixed in the presence of water with a suitable base, such as magnesium oxide, promoters incorporated in the mixture as required, catalyst shapes formed therefrom, and such shapes dried and/or roasted. Although the materials so prepared have the requisite catalytic activity, the mechanical properties leaves much to be desired, since they tend to disintegrate in use, resulting not only in changes in the flow characteristics of gases passing therethrough and causing particles of catalyst to be carried away with such gases, but also necessitating the reworking or regeneration of the catalyst in order to produce a suitable catalyst mass.

The present invention is directed to a method for the production of rugged metal oxide catalyst wherein slurries of one or more precipitated metal oxide compounds are mixed with magnesium oxide. A promoter or promoters, in the form of either precipitated metal oxide compound or other promoter-containing material, are incorporated therewith, the resultant mixture is formed into shapes, and the shapes so formed are dried and/or roasted.

One example of the operation of the process of the present invention is given for the production of an active carbon monoxide oxidation catalyst prepared from ferrous sulfate and sodium carbonate, magnesia, aluminum sulfate and ammonia, and potassium dichromate. Ferrous carbonate was precipitated by a countercurrent mixing of ten-percent solutions of ferrous sulfate and sodium carbonate at 60° C., using an amount of sodium carbonate two percent in excess of the stoichiometrical requirement. After thirty minutes aging, the precipitate was agitated briefly and then allowed to settle. The thickened slurry was washed with hot water in a series of decantation and repulping operations and mixed with an amount of magnesia equivalent to 90% of the total magnesia requirement for the catalyst. The resulting mixture was filtered, washed, dried at 110° C., and ground. Although dried at 110° C., the ferrous carbonate-magnesia mixture still contained a substantial proportion of water. Aluminum hydroxide was prepared by precipitation from a dilute solution of aluminum sulfate with ten percent aqueous ammonia at 85° C. The precipitate was agitated a short time, allowed to settle, a slurry of aluminum hydroxide withdrawn, the remaining ten percent of the magnesium requirement for the catalyst added, the mixture filtered, washed, repulped with hot water, and potassium dichromate requirement for the catalyst added to produce the promoter slurry. The fine ferrous carbonate-magnesia mixture was mixed with the promoter slurry to produce a stiff mixture. This mixture was extruded, using a vacuum for deairing, in the form of rods which were cut in short lengths. The resulting cylindricules were dried for one to two hours at 130° C., and thereafter heated at 250° C. for two hours to form the finished catalyst. This catalyst contained in parts, by weight, the following: $Fe_2O_3$, 100; $MgO$, 33.3; $CrO_3$, 9.9; $K_2O$, 4.6; and $Al_2O_3$, 0.75; and had a crushing strength of 5200 pounds per square inch.

The catalyst so prepared was charged into four pairs of catalyst chambers, each chamber containing 475 cubic feet (approximately 15 tons) of catalyst. Each pair of catalyst chambers was connected in a series of make one converter unit consisting of a primary converter and a secondary converter with a heat exchanger between the two converters. The gaseous mixture for treatment by catalyst contained approximately three parts by volume of steam and one part by volume of a modified water gas of the following average composition: $CO$, 33.3%; $H_2$, 35.8%; $N_2$, 23.4%; $CO_2$, 7%. This gaseous mixture passing from the shell side of the heat exchanger at 920° F., entered the primary converter at a temperature of 920° F., and left said converter at 1040° F. with approximately 80% of the total conversion of CO to $CO_2$. The partially converted gas was then passed through the tube side of said heat exchanger, where it was cooled back to 920° F., at which temperature it passed into the second converter. The gas leaving the second converter rose in temperature to only 950° F., thereby providing a lower catalyst temperature favorable for application to equilibrium. The total conversion efficiency of the catalyst was 98.8%. After three months' operation, both the primary converters became clogged with very fine dust deposited from the modified water gas and had to be shut down. The catalyst was withdrawn from the chambers, screened, tumbled, and re-screened, and returned to the converter. Activity tests after the first treatment for dust removal reveal that the used catalyst was 97% as efficient as the new catalyst. Mechanical loss in handling the catalyst in this manner was approximately 5%.

It is evident that there are numerous factors which will influence the conditions for the most satisfactory operation of my invention, the actual limits of which cannot be established except by detailed study of each set of raw materials and intermediate and finished products involved.

According to the present invention, rugged active metal oxide catalysts are produced by mixing a slurry of precipitated metal oxide compound with magnesium oxide, preferably precipitated magnesium oxide which has been subsequently roasted. The types of precipitated metal oxide compounds which are typified as suitable for use in this connection are precipitated hydroxides, such as iron, aluminum and chromium, or precipitated metal oxide containing compounds which are susceptible to the subsequent production of metal oxides therefrom, such as ferrous carbonate described in the example above. The precipitated metal oxide compound used may be in proportions such that it is considered to be one of the base materials even though it is in itself an active catalyst, or it may be one of the constituents of the charge which is in relatively small proportion and is generally recognized as a promoter material. A slurry of a single precipitated metal oxide compound may be mixed with one portion of the magnesia required for the production of a catalyst and other precipitated metal oxide compounds may be mixed with other portions of the magnesia requirement catalyst, or mixtures of the metal oxide compounds may be incorporated with the total magnesia requirement. Any additional promoters which may be required may be incorporated in any of such catalysts.

The mixtures of the slurry of the precipitated metal oxide compound and magnesia may be dewatered by either filtering or filtering and drying to a relatively low temperature, such as 110° C. The extent to which any one of the mixtures will be dewatered will depend upon the amount of water in any other mixture which is to be incorporated with it so that finally a mixture of viscous constituency suitable for forming into shapes may be obtained.

A particularly satisfactory method for forming the final mixture into shapes is by extruding in a desirable configuration, preferably while using a vacuum to deair the material being extruded. The shapes so formed may be segmented to the desired size and then dried to produce the final catalyst particles. It is indicated in the example above that this drying is preferably carried out stepwise: first, at relatively low temperature to remove the larger portion of the water, and thereafter at higher temperatures to properly harden the catalyst particles.

The present invention provides a method for making an active oxidation catalyst which is mechanically rugged in that it is not susceptible to disintegration in service and in that it has sufficient strength to have extraneous deposits abraded therefrom without any substantial loss of catalytic material. Catalyst so prepared has been used successfully in full plant size commercial operations for more than ten months.

It will be seen, therefore, that this invention actually may be carried out with a number of variations without departing from its spirit and scope.

I claim:

1. A process for making a rugged carbon monoxide oxidation catalyst which comprises (a) admixing a slurry of a basic iron precipitate selected from the group consisting of carbonate and hydroxide with magnesium oxide, (b) admixing a slurry of a precipitated aluminum oxide compound with a further portion of magnesium oxide, (c) adding potassium dichromate in an amount such as to serve as a promoter material to at least one of said admixtures, (d) finally mixing said admixtures, at least one of which contains said promoter material, (e) extruding the resultant mixture into formed shapes, and (f) drying the formed shapes.

2. A process for making a rugged carbon monoxide oxidation catalyst which comprises (a) admixing a slurry of precipitated ferrous carbonate with magnesium oxide, (b) admixing a slurry of precipitated aluminum hydroxide with a further portion of magnesium oxide, (c) adding potassium dichromate in an amount such as to serve as a promoter material to at least one of said admixtures, (d) finally mixing said admixtures, at least one of which contains said promoter material, (e) extruding the resultant mixture into formed shapes, and (f) drying the formed shapes.

3. A process for making a rugged carbon monoxide oxidation catalyst which comprises (a) admixing a slurry of precipitated ferrous carbonate with magnesium oxide, (b) admixing a slurry of precipitated aluminum hydroxide with a further portion of magnesium oxide, (c) adding potassium dichromate in an amount such as to serve as a promoter material to the magnesium oxide-aluminum hydroxide mixture, (d) admixing the magnesium oxide-ferrous carbonate mixture and the promoter containing magnesium oxide-aluminum hydroxide mixture, (e) extruding the resultant mixture into formed shapes, and (f) drying the formed shapes.

JOSEPH G. DELY.

REFERENCES CITED

The following references are of record in the file of this patent:

UNITED STATES PATENTS

| Number | Name | Date |
| --- | --- | --- |
| 1,771,130 | Larson | July 22, 1930 |
| 1,330,772 | Bosch | Feb. 10, 1920 |
| 1,672,528 | Heissler | June 5, 1928 |
| 1,680,807 | Schultze | Aug. 14, 1928 |
| 2,038,566 | Huettner et al. | Apr. 28, 1936 |
| 2,063,302 | Eversole | Dec. 8, 1936 |
| 2,197,707 | Crittenden | Apr. 16, 1940 |
| 1,943,821 | Hanks | Jan. 16, 1934 |
| 2,211,022 | Michael | Aug. 13, 1940 |